United States Patent [19]

Farrauto et al.

[11] Patent Number: 5,804,155

[45] Date of Patent: Sep. 8, 1998

[54] BASIC ZEOLITES AS HYDROCARBON TRAPS FOR DIESEL OXIDATION CATALYSTS

[75] Inventors: Robert J. Farrauto, Westfield; Michel Deeba, North Brunswick, both of N.J.

[73] Assignee: Engelhard Corporation, Iselin, N.J.

[21] Appl. No.: 576,423

[22] Filed: Dec. 18, 1995

Related U.S. Application Data

[63] Continuation-in-part of Ser. No. 255,289, Jun. 7, 1994, which is a continuation of Ser. No. 38,378, Mar. 29, 1993, abandoned, which is a continuation-in-part of Ser. No. 973,461, Nov. 19, 1992, abandoned.

[51] Int. Cl.⁶ .......................................................... B01J 8/02
[52] U.S. Cl. .................................... 423/239.2; 423/213.2; 95/143
[58] Field of Search .............................. 423/213.2, 213.5, 423/239.1, 239.2; 95/143

[56] References Cited

U.S. PATENT DOCUMENTS

| | | | |
|---|---|---|---|
| 4,929,581 | 5/1990 | Steinwandel et al. | 502/2 |
| 5,078,979 | 1/1992 | Dunne | 423/212 |
| 5,125,231 | 6/1992 | Patil et al. | 60/274 |
| 5,330,945 | 7/1994 | Beckmeyer et al. | 502/66 |
| 5,336,476 | 8/1994 | Kintaichi et al. | 423/239.1 |

FOREIGN PATENT DOCUMENTS

| | | | |
|---|---|---|---|
| 0499931A1 | 8/1992 | European Pat. Off. | |
| 0 586 830 A1 | 3/1994 | European Pat. Off. | B01D 53/02 |
| 0499931B1 | 6/1995 | European Pat. Off. | |
| 0 661 098 A2 | 7/1995 | European Pat. Off. | B01J 35/04 |
| 4226111A1 | 2/1994 | Germany | |
| 4226112A1 | 2/1994 | Germany | |
| 4105534C2 | 12/1994 | Germany | |
| 43 26 121 A1 | 2/1995 | Germany | B01D 53/94 |
| WO 94/11623 | 6/1994 | WIPO | F01N 3/20 |
| WO 94/22564 | 10/1994 | WIPO | B01D 53/36 |

OTHER PUBLICATIONS

B.C. Gates, Chemistry of Catalytic Processes, McGraw Hill, 1978 1978 p. 64.

Scherzer, The Preparation and Characterization of Aluminum–Deficient Zoelites, Catalytic Materials, American Chemical Society 1984 (0097 6156/84/0248 0157), pp. 157–200.

Breck, Zeolite Molecular Sieves, Structure, Chemistry and use, Chapter 7, Ion–Exchange Reactions and Zeolites, beginning p. 529, John Wiley & Sons, New York 1974.

*Primary Examiner*—Steven Bos
*Assistant Examiner*—Thomas G. Dunn Jr.
*Attorney, Agent, or Firm*—Richard A. Negin

[57] ABSTRACT

The present invention relates to a composition comprising at least one zeolite consisting essentially of the zeolites selected from the group of neutral and basic zeolites and at least one platinum group metal component. This composition has been found to be useful in a method of treating gas streams comprising hydrocarbons comprising the steps of adsorbing the hydrocarbons on the recited zeolites at a low adsorption temperature range, releasing the hydrocarbons from the zeolite at a high release temperature range and oxidizing the hydrocarbons.

8 Claims, 4 Drawing Sheets

BASIC ZEOLITES AS HYDROCARBON TRAPS FOR DIESEL OXIDATION CATALYSTS

CROSS-REFERENCE TO RELATED APPLICATION

This application is a continuation-in-part of Ser. No. 08/255,289 filed Jun. 7, 1994 which is a continuation of Ser. No. 08/038,378 filed Mar. 29, 1993 now abandoned, which is a continuation-in-part of application Ser. No. 07/973,461 filed Nov. 19, 1992, now abandoned, all hereby incorporated by reference.

BACKGROUND OF THE INVENTION

1. Field of the Invention

This invention relates to a catalyst composition and method for the oxidation of gaseous oxidizable hydrocarbon components of motor vehicle diesel engine exhaust.

2. Background and Related Art

As is well-known, diesel engine exhaust is a heterogeneous material which contains gaseous pollutants such as carbon monoxide ("CO") and unburned hydrocarbons ("HC"), and nitrogen oxides as ("NOx") as well as soot particles which comprise both a dry, solid carbonaceous fraction and a soluble organic fraction. The soluble organic fraction is sometimes referred to as a volatile organic fraction ("VOF"), which terminology will be used herein. The VOF may exist in diesel exhaust either as a vapor or as an aerosol (fine droplets of liquid condensate) depending on the temperature of the diesel exhaust.

Oxidation catalysts comprising a platinum group metal dispersed on a refractory metal oxide support are known for use in treating the exhaust of diesel engines in order to convert both HC and CO gaseous pollutants and particulates, i.e., soot particles, by catalyzing the oxidation of these pollutants to carbon dioxide and water.

The prior art also shows an awareness of the use of zeolites, including metal-doped zeolites, to treat diesel exhaust. For example, U.S. Pat. No. 4,929,581 discloses a filter for diesel exhaust, in which the exhaust is constrained to flow through the catalyst walls to filter the soot particles. A catalyst comprising a platinum group metal-doped zeolite is dispersed on the walls of the filter to catalyze oxidation of the soot to unplug the filter.

Efforts have been made in the art to use zeolite acids to crack particulate hydrocarbons. European Patent 0 499 931 B 1 is directed, to the use of a catalyst for reducing the quantity and/or size of particles and exhaust gases of diesel engines. This catalyst is characterized in using zeolites such as faujasite, pentasil or mordenite with acidic properties to crack to long chain and aromatic hydrocarbons. This patent claims priority from German Patent DE 4105534C2 which discloses the use of acidic zeolites to crack long chain hydrocarbons. Additionally, DE 4226111A1 and DE 4226112A1 are patents which also disclose the use of acidic zeolites. In DE 4226111A1, noble metal and acid zeolites are disclosed as a composition to use catalyze the reduction of mass and/or size of particles. DE 4226112A1 discloses compositions using transitional metal oxide and an acid zeolite for similar reasons. U.S. Pat. No. 5,330,945 discloses a catalyst treatment of diesel exhaust particles. Such a composition discloses a zeolite having exchangeable cations at cationic sites in combination with silica and very fine particles of catalytic metal. The goal, here again, is to permit penetration of hydrocarbon to be cracked and oxidized.

As is well-known in the art, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known to include an adsorbent material, which may be a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature. In this regard, see for example U.S. Pat. No. 5,125,231 which discloses (columns 5–6) the use of platinum group metal-doped zeolites as low temperature hydrocarbon adsorbents as well as oxidation catalyst.

As indicated above, zeolites are extremely useful and practical materials in that they possess unique pore structures typical of dimensions comparable to molecular dimensions and their exchangeable cations that are often converted to acid functions. The combination of these properties make them especially useful for acid catalyzed reactions such as catalytic cracking and isomerization. Acid zeolites have special utility in cracking the particulate matter present in the exhausts of diesel engines. For this application the greater the acidity the better performance one would predict.

SUMMARY OF THE INVENTION

The present invention relates to a composition and methods of preparation and use of the composition. The composition comprises at least one zeolite consisting essentially of a zeolite selected from the group of neutral zeolites and basic zeolites. The composition can be supported on a substrate carrier such as a honeycomb support which may be made of a refractory material or metal material. The composition can further comprise oxidizing catalytic components such as at least one platinum group metal. The composition can further comprise at least one base metal compound.

The composition of the present invention is particularly useful for treating gas streams comprising hydrocarbons. Gas streams to which the present method is applicable particularly include diesel engine exhaust streams which comprise hydrocarbons. The method comprises feeding the diesel engine exhaust gas stream to a composition comprising a zeolite selected from the group consisting of neutral zeolites and basic zeolites. At least some of the hydrocarbons are adsorbed onto the zeolites at a low adsorption temperature range, typically below 200° C. and more typically from room temperature to 175° C. As the diesel engine exhaust gases heat up, the hydrocarbons release from the zeolite composition at a high release temperature range, typically above 175° C. and more typically above 200° C. The released hydrocarbons are then oxidized.

The oxidation can take place within the composition comprising the zeolite where there are oxidation catalytic components located therein separate from the zeolite. Alternatively, the oxidation can take place in undercoat layer, overcoat layer or in downstream layer(s) containing oxidation catalysts. Preferably the light off temperature at which oxidation begins to take place is at or below the high release temperature range at which the hydrocarbons are released from the zeolites on which they are adsorbed.

The present invention provides several advantages over the current state of the art. Initially, low temperature gases containing hydrocarbons which pass over the present composition are trapped or adsorbed onto the neutral or basic zeolites. As the gas heats up, such as diesel exhaust gas in an engine that is warming up, the exhaust gas in addition to passing over the zeolites which adsorb hydrocarbons from the exhaust gas heats the composition containing the zeolites as well as the oxidizing catalytic components of the composition or of separate downstream or coated composition layers. The hydrocarbons are preferably at a temperature at which they can be catalytically oxidized to form innocuous components such as carbon dioxide and water.

The state of the art represented by various patents disclosed in the Background of the Invention address diesel engine exhaust as does the present invention. However, there is no recognition or disclosure to use neutral or basic zeolites. Such zeolites perform little or no catalytic cracking of long chain hydrocarbons at low temperatures where hydrocarbons are adsorbed. Acidic zeolites are disclosed to be directed to cracking long chain hydrocarbons present in exhaust gases. The present invention is using classes of zeolites which have little or no cracking capability at low temperatures but are capable of adsorbing hydrocarbons which can be released when the oxidation catalyst present has heated to a sufficiently high temperature to catalyze oxidation.

For the purpose of the present invention, neutral zeolites are defined as zeolites where the alumina is substantially removed from the zeolite which retains its zeolitic crystalline structure. Additionally, for the purpose of the present invention, neutral or basic zeolites are zeolites which show substantially no protonic character or cracking activity as indicated in B. C. Gates, *Chemistry of Catalytic Processes,* McGraw Hill at page 64, (1978) hereby incorporated by reference. Accordingly, sodium Y zeolite is not an active catalyst for reactions catalyzed by acids as indicated in the Chemistry of Catalytic Processes. In specific and preferred embodiments, preferred basic zeolites have substantially all of the exchangeable acid groups exchanged with alkali metal cations or alkaline earth metal cations.

DESCRIPTION OF THE PREFERRED EMBODIMENTS

Figure 1:
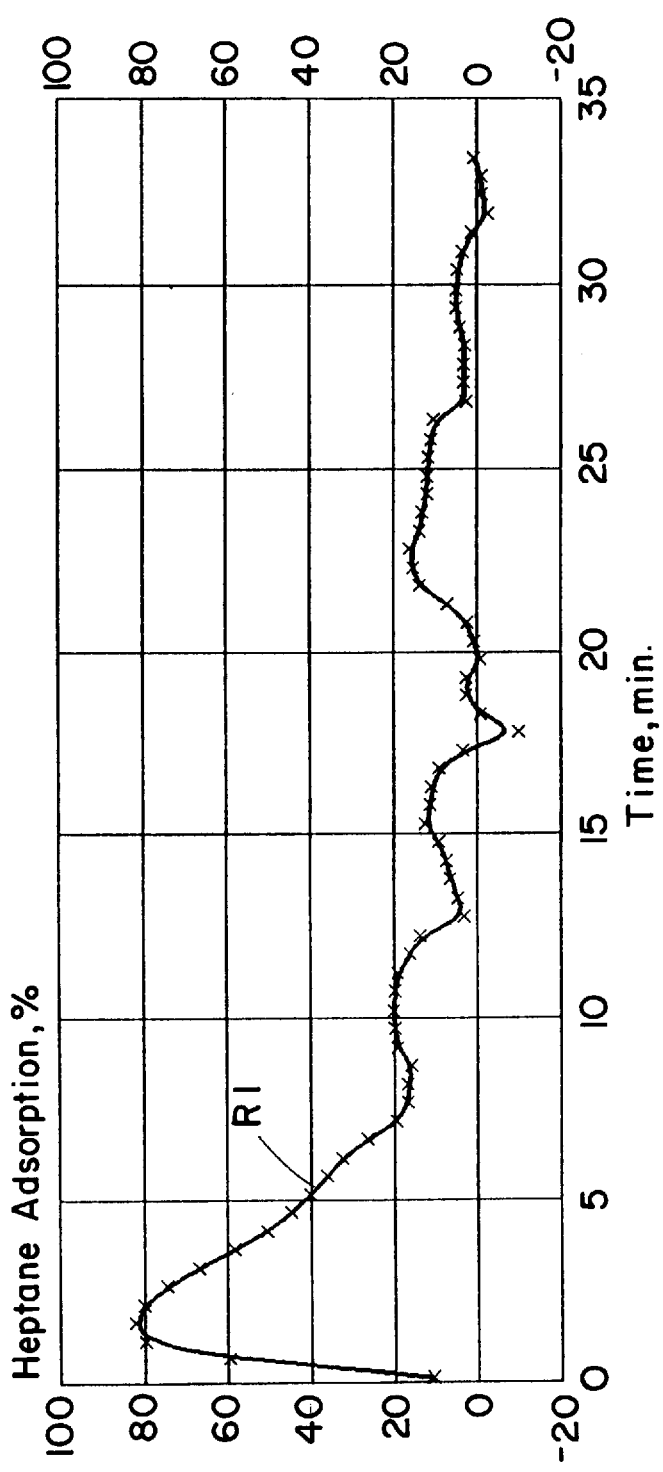
FIG. 1 is a curve of heptane adsorption versus time when using an acidic Beta zeolite of Example 1.

The present invention is directed to a composition, related methods of preparation and use, and articles which comprise a zeolite selected from the group of neutral zeolites and basic zeolites. The composition is particularly useful to treat gases containing hydrocarbons and, in particular, diesel engine exhaust gas streams which contain hydrocarbons. The neutral and basic zeolites trap the hydrocarbons at low temperatures without cracking them to smaller molecules. The hydrocarbons are released from the zeolite when the temperature of the zeolite is increased as the engine warms up and the exhaust gas heats zeolite composition. The released hydrocarbons can then be oxidized using oxidation catalytic components, as separate particles from the zeolite particles, as part of the zeolite composition, or in separate oxidation catalytic compositions. Such compositions may be used as undercoats or overcoats to the zeolite composition or used downstream of the zeolite composition.

The zeolite composition of the present invention can comprise in a mixture therewith diesel oxidation catalysts of the type known in the art such as disclosed in commonly assigned U.S. Ser. No. 08/255,289 filed Jun. 7, 1994 to Yavuz, et al.; U.S. Ser. No. 08/405,279 filed Mar. 16, 1995 to Voss, et al. and U.S. Ser. No. 08/457,557 filed Jun. 1, 1995 to Farrauto, et al. all herein incorporated by reference.

Where the zeolite composition of the present invention is used in combination with an oxidizing composition, the zeolite composition comprises from 10 to 90, preferably from 20 to 70, more preferably 30 to 60 percent of the combined composition.

Still another aspect of the invention provides for an article comprising a refractory carrier substrate having a plurality of parallel or flow through exhaust flow passages extending therethrough and defined by passage walls on which the present zeolite containing composition is coated, and further optionally comprising a platinum group metal component on particles which are separate from the zeolite particles, preferably a platinum or palladium metal component, with dispersed platinum carried on the catalytic material in an amount of from about 0.1 to about 60, e.g., 0.1 to 15, preferably 0.1 to 5 g/ft$^3$ or dispersed palladium carried on the catalytic material in a quantity of from about 0.1 to 200, preferably 20 to 120 g/ft$^3$.

In accordance with the method aspect of the present invention, there is provided a method for treating a diesel engine exhaust stream containing hydrocarbons, the method comprising contacting the stream with the neutral or basic zeolite containing composition at temperatures in the low temperature adsorption range, typically below 200° C., more typically from ambient to 175° C. As the zeolite catalyst heats up to a high release temperature, typically greater than about 175° C., and more typically to greater than 200° C., the catalyst compositions described above release under oxidizing conditions including a temperature high enough to catalyze oxidation of at least some of the hydrocarbons while the engine runs cool, they adsorb the hydrocarbons.

The composition of the present invention can contain additives to enhance oxidation of volatile organic components as well as carbon monoxide and hydrocarbons present in the gas stream, particularly in diesel exhaust-gas streams. Such materials are well known in the art and are described in the above referenced commonly assigned and copending patent applications. Such materials can include base metal components. Particularly preferred base metals include base metal oxides selected from the group consisting of ceria, alumina, titania and zirconia. Useful compositions can include bulk ceria and/or bulk alumina each having surface areas on a carrier substrate of at least about 10 m$^2$/g, more typically at least about 20 m$^2$/g. Aluminum typically has a surface area of about 120 to 180 m$^2$/g and the bulk ceria may have a surface area of from about 70 to 150 m$^2$/g.

The Neutral or Basic Zeolite

The zeolite employed serves both to adsorb hydrocarbons in the low adsorption temperature range during periods of relatively low temperature operation, to trap gas-phase hydrocarbons within the zeolite pores. If the zeolite composition further comprises separate particles of oxidation catalyst components, the trapped gas-phase hydrocarbons are brought into intimate contact with the oxidation catalyst which facilitates oxidation of the hydrocarbons. In any case, the zeolite pores also serve to retain some of the gas-phase hydrocarbons during start-up or other periods when the catalyst is relatively cool and therefore less effective in catalyzing oxidation reactions, and to release the hydrocarbons only when the catalyst has been heated to higher temperatures. The higher temperatures impart sufficient energy to the trapped hydrocarbon molecules to enable them to escape the zeolite pores, but also enhance oxidation of the hydrocarbons in contact with the oxidation catalyst.

The zeolite can be prepared by starting with any zeolite even zeolite which is in the acid form. The neutral zeolite can be prepared by dealumination techniques which are known in the art. Such dealumination can be achieved by increasing the silica to alumina molar ratios by methods known in the art.

The silica to alumina molar ratio may be increased, for example, by reacting the Beta zeolite with an acid. Scherzer, *The Preparation and Characterization of Aluminum-Deficit Zeolites,* Catalytic Materials, American Chemical Society 1984 (0097 6156/84/0248 0157), pp. 157–200, is directed to methods of preparation of aluminum-deficient zeolites. Three methods include thermal or hydrothermal dealumination; chemical dealumination;. and a combination of thermal and chemical dealumination. While thermal or hydrothermal treatment can be used, this results in a partial framework dealumination with the aluminum remaining in the zeolite cages or channels. The preferred chemical treatment can be carried out with a variety of reagents and results in the removal of aluminum from the zeolite in a soluble or volatile form. The preferred chemical dealumination can be achieved by reacting the zeolite with a suitable reagent in solution (aqueous or nonaqueous); or by reacting the zeolite with a reagent in the vapor phase at high temperature. Preferably dealumination is accomplished in solution by reacting the zeolite with solutions of acids, salts or relating agents and most preferably acids. Useful acids include mineral acids such as sulfuric acid, hydrochloric acid and nitric acid with sulfuric acid most preferred. Breck, supra, discloses that aluminum may be removed from the framework of certain zeolites by the treatment with acids and gives examples of increasing the silicon to alumina ratio by treatment with hydrochloric acid (Breck, supra, pp. 505–507).

The zeolite and the acid are preferably reacted at ambient temperature and pressure in a reaction vessel. The resulting reaction product is separated and washed with deionized water and filtered. The reaction product is then dried. The molar ratio of silica to alumina can be determined by known methods, preferably X-ray fluorescence. A preferred analytic procedure for determining the $SiO_2/Al_2O_3$ ratio is to calcine a sample for one hour at 1,000° C. The sample is mixed with ten parts by weight of a fluxing agent, preferably an 80/20 weight ratio of lithium metaborate to lithium tetraborate. The mixture is fused for about 5 minutes at 1,200° C. The resulting mixture in the form of a button is analyzed by X-ray fluorescence. This is done using a reference comparison.

The acid treated dealuminized zeolite can then be washed with water to remove the acid used to dealuminate the zeolite framework.

The basic zeolites can be prepared using common impregnation or ion-exchange techniques. Such ion-exchange techniques are well known in the art and reviewed in Breck, *Zeolite Molecular Sieves, Structure, Chemistry and Use, Chapter 7, Ion-Exchange Reactions and Zeolites,* beginning at page 529, published by John Wiley & Sons, New York, 1974. Useful ion-exchange compounds include alkali metal cation containing materials such as alkaline earth metal cation containing material. Such cation containing materials include water soluble salts such as nitrates, sulfates, oxalates, chlorides and the like, with nitrates being preferred. The reaction can take place by mixing the alkali or alkaline earth metal salts in an aqueous solution with the zeolite for a sufficient time and temperature to form a basic ion-exchange zeolite. Typical reaction times range from 0.5 to 4.0 hours at from ambient up to 100° C. and more typically from 50° to 75° C. The exchanged zeolite can then be filtered and washed with water and dried at a suitable drying temperature and air, typically from 50° to 150° C. The zeolite can then be calcined or formed into a slurry coated on a carrier substrate and calcined at temperatures ranging from 400° to 600° C. for from 0.5 to 12.0 hours.

When loaded onto a carrier substrate washcoat the amount of catalyst expressed in grams per cubic inch of surface area can range from 0.5 to 20.0 or more grams per cubic inch.

The Carrier Substrate

The carrier used in this invention should be relatively inert with respect to the catalytic composition dispersed thereon. The preferred carriers are comprised of ceramic-like materials such as cordierite, α-alumina, silicon nitride, zirconia, mullite, spodumene, alumina-silica-magnesia or zirconium silicate, or of refractory metals such as stainless steel. The carriers are preferably of the type sometimes referred to as honeycomb or monolithic carriers, comprising a unitary body, usually cylindrical in configuration, having a plurality of tine, substantially parallel gas flow passages extending therethrough and connecting both end-faces of the carrier to provide a "flow-through" type of carrier. Such monolithic carriers may contain up to about 700 or more flow channels ("cells") per square inch of cross section, although far fewer may be used. For example, the carrier may have from about 7 to 600, more usually from about 200 to 400, cells per square inch ("cpsi").

While this discussion and the following examples relate to flow-through type carrier substrates, wall-flow carriers (filters) may also be used. Wall-flow carriers are generally similar in structure to flow-through carriers, with the distinction that each channel is blocked at one end of the carrier body, with alternate channels blocked at opposite end-faces. Wall-flow carrier substrates and the support coatings deposited thereon are necessarily porous, as the exhaust must pass through the walls of the carrier in order to exit the carrier structure.

The Catalytic Material

The neutral or basic zeolite can be used in combination with a catalytic material. Where used in the same composition or layer, the catalytic material is on separate particles than the zeolite particles so the neutral or basic character of the zeolite is not adversely affected. This composition can be prepared in the form of an aqueous slurry of ceria, alumina (optional) and zeolite particles and platinum or palladium catalytic metal component if one is to be dispersed on the catalytic metal component if one is to be dispersed on the catalytic material. The slurry is then applied to the carrier, dried and calcined to form a catalytic material coating ("washcoat") thereon. Typically, the catalyst particles and zeolite particles are mixed with water and an acidifier such as acetic acid, nitric acid or sulfuric acid, and ball milled to a desired particle size. Fixing the platinum group metal onto the base metal oxide particles may be carried out by calcination or by treatment with hydrogen sulfide or by other known means, to render the metal in water-insoluble form. Suitable platinum compounds for use in the foregoing process include potassium platinum chloride, ammonium platinum thiocyanate, amine-solubilized platinum hydroxide and chloroplatinic acid, as is well known in the art. During calcination, or at least during the initial phase of use of the catalyst, such compounds, if present, are converted into the catalytically active elemental platinum metal or its oxide. Palladium nitrate or palladium analogs of the aforementioned platinum compounds may be used to provide palladium. These catalytic particles may be added to the zeolite particle composition.

Preparing the Catalyst Composition

Generally, a slurry of particles of the present composition will be deposited upon the carrier substrate and dried and calcined to adhere the catalytic material to the carrier and, when the dispersed platinum or palladium compound is present, to revert the platinum or palladium compound to the elemental metal or its oxide.

When the catalytic material or any component is applied to a suitable honeycomb carrier, such as described above, the amount of the component is conventionally expressed herein and in the claims as weight of component per unit volume of catalyst, as this measure accommodates the presence of different sizes of catalyst composition voids provided by different carrier wall thicknesses, gas flow passage dimensions, etc. Grams per cubic inch ("g/in$^3$") units are used herein and in the claims to express the quantity of relatively plentiful components such as the zeolite material, and grams per cubic foot ("g/ft$^3$") units are used to express the quantity of the sparingly-used ingredients, such as the platinum metal. For typical diesel exhaust applications, the zeolite or zeolite plus catalytic material of the present invention generally may comprise from about 0.25 to about 4.0 g/in$^3$, preferably from about 0.25 to about 3.0 g/in$^3$ of the coated carrier substrate. The catalytic material may optionally also include from about 0.1 to 60, preferably from about 0.1 to 15 g/ft$^3$ of dispersed platinum or from about 0.1 to 200, preferably from about 20 to 120 g/ft$^3$ of dispersed palladium.

While the invention has been described in detail with respect to specific preferred embodiments thereof it will be appreciated that variations thereto may be made which nonetheless lie within the scope of the invention and the appended claims.

EXAMPLES

Example 1
Preparation of Acidic H-Beta Zeolite

Betz zeolite was obtained from Engelhard Corporation. The acid for of the Beta zeolite was prepared as follows. Dissolve 150 g of ammonium nitrate in 800 ml of water and adjust pH to 3. Add 200 g of the Beta zeolite (as received) and mix for 2 hours at 70° C. The mixture was then filtered and washing using 1 liter of water. The filtered Beta material was then dried overnight at 100° C. 100 g of the exchanged Beta was further exchanged as follows: Dissolve 100 g of ammonium nitrate in 400 ml of water. The pH of the solution was adjusted to a pH of 3. Add 100 g of dried Beta to the nitrate solution and exchange for 2 hours at 70° C. The beta zeolite was then filtered and washing with 1 liter of water. The wet cake was then slurried in water to make a slurry with solid content of 45%. The slurry was then coated onto a honeycomb substrate of 1.5"×3.0". The washcoat loading was adjusted to give 1.7 g/in$^3$. The catalyst was then dried at 100° C. and calcined at 550° C. for 2 hours to form the acidic H-Beta material. This catalyst is referred to as reference catalyst 1 (R-1). The catalyst was tested according to Procedure 1 and the results are given in FIG. 1. The maximum HC trapping efficiency of the acidic Beta zeolite was about 80%.

Example 2
Preparation of Basic Na-Beta

Figure 2:
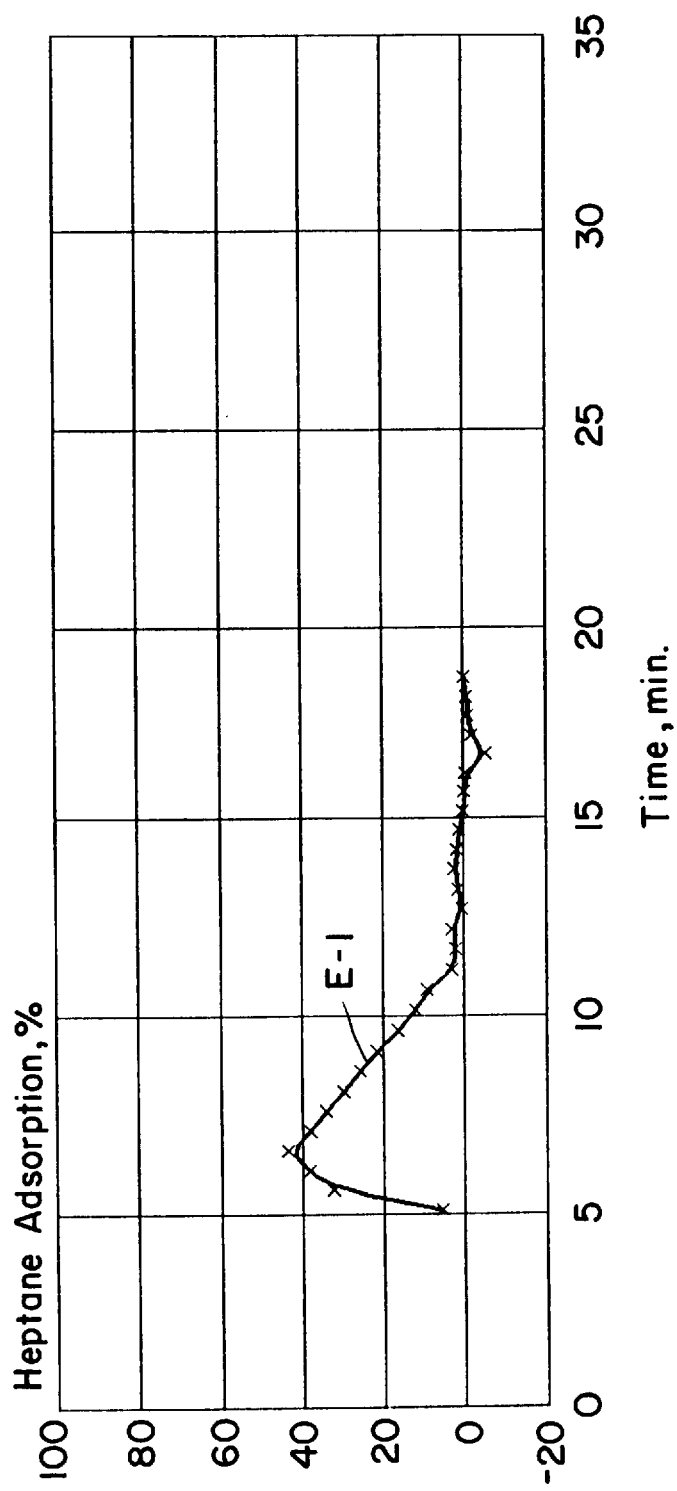
FIG. 2 is a curve of heptane adsorption versus time for sodium Beta zeolite used in Example 2.

The basic Na-Beta was prepared by exchanging with sodium nitrate using the following exchange procedure: Dissolve 150 g of sodium nitrate in 600 ml of water. Add 100 g of a received Beta zeolite and mix for 2 hours at 70° C. The exchanged Beta zeolite was filtered and washed with 1 liter of water and dried overnight at 100° C. The procedure was repeated again using same procedure. The material was filtered and washed with water. The wet cake was then slurried in water to make 45% solid. The slurry was coated onto a 1.5"×3.0" substrate, dried at 100° C. and calcined at 550° C. for 2 hours. The washcoat loading was 1.9 g/in$^3$. This catalyst was labeled Experimental Sample (E-1). The Na-Beta zeolite was tested according to procedure 1 and the results of testing is given in FIG. 2. It is clear from the testing results that a basic oxide material such as Na2O exchanged Beta zeolite is capable to effectively trap hydrocarbon such as heptane.

Example 3
Preparation of Mg/Beta

Figure 3:
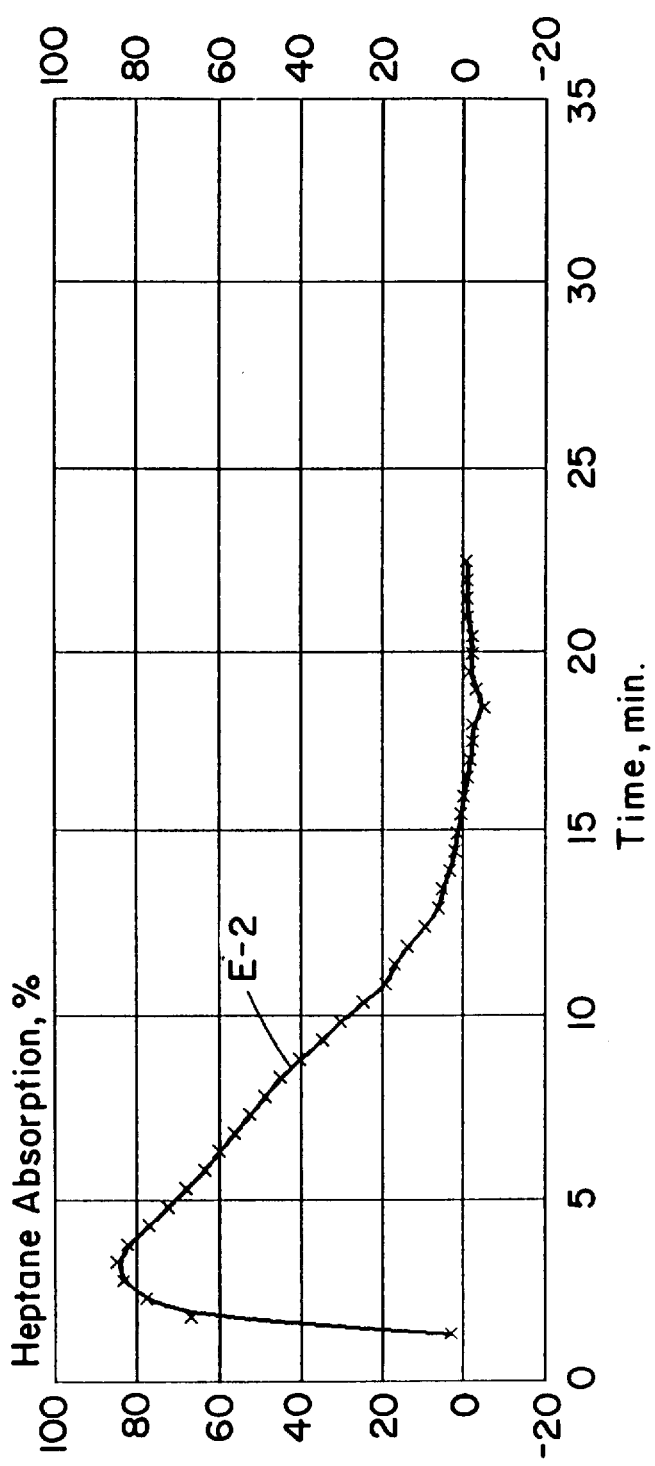
FIG. 3 is a curve of heptane adsorption versus time for magnesium Beta zeolite used in Example 3.

Dissolve 100 g of magnesium nitrate in 300 ml of water. Add 100 g of Beta zeolite (as received) and mix for 2 hours at 70° C. The catalyst was then filtered and washed with 1 liter of water. The wet cake was then made into a slurry with solid content of 30%. The slurry was coated onto 1.5"×3.0" substrate. The catalyst was coated twice to have effectively a washcoat loading of 1.96 g/in$^3$ based on calcined material. The catalyst was then dried at 100° C. and calcined at 550° C. for 2 hours. This catalyst is referred to Experimental Sample 2 (E-2). The trapping capacity of the Mg/Beta was tested using procedure 1 and the results of testing is given in FIG. 3. Comparison of the Mg/Beta material with acidic Beta zeolite (H-Beta) showed clearly that the Mg/Beta material had higher heptane trapping capacity than H-Beta. The Mg/Beta had significantly broader heptane adsorption peak than the H-Beta indicating a higher HC trapping capacity.

Example 4
Preparation of Ca/Beta

Figure 4:
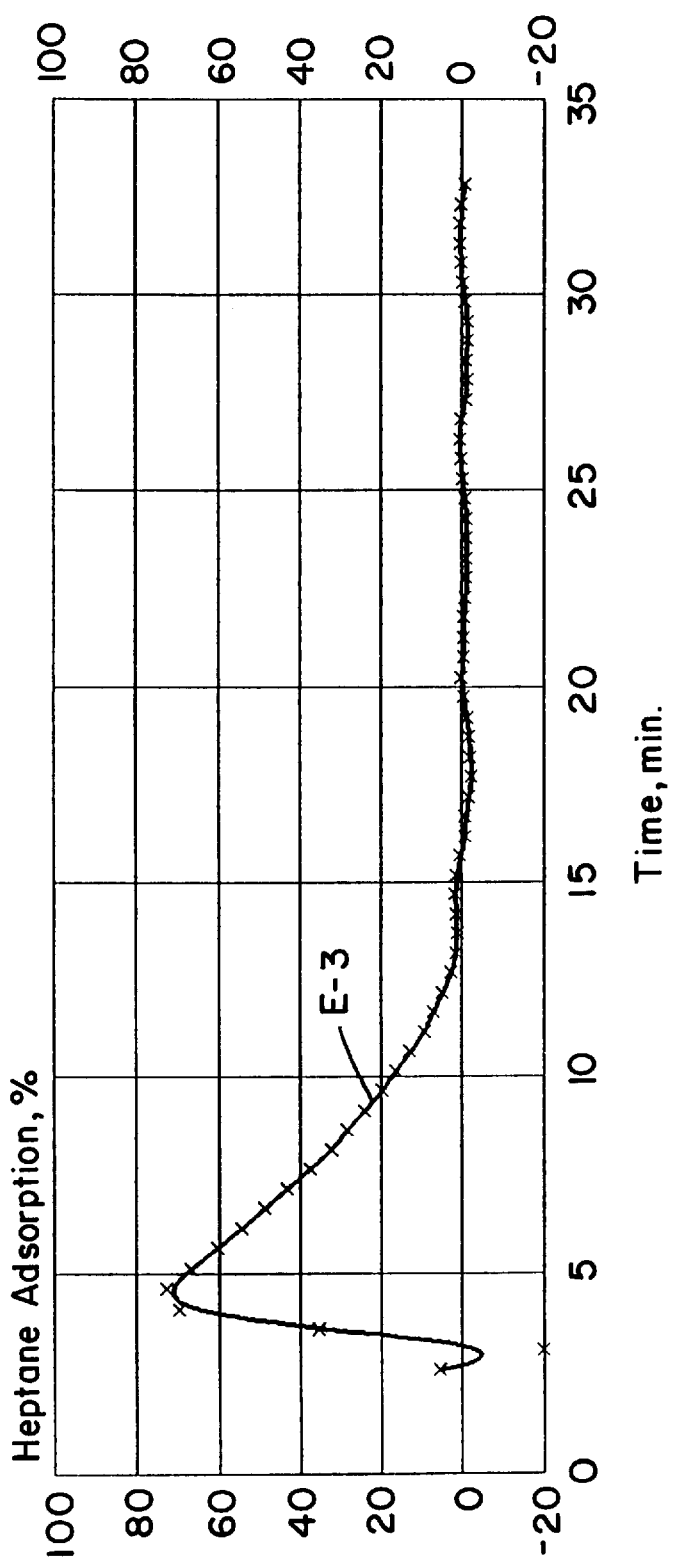
FIG. 4 is a curve of heptane adsorption versus time for calcium Beta zeolite used in Example 4.

Ca exchanged Beta zeolite was prepared as follows: Dissolve 100 g of Ca(NO$^3$)2 in 400 ml of water. Add 100 g of Beta zeolite and mix for 2 hours at 70° C. The catalyst is filtered and washed with 1 liter of water. The CaO/Beta was then made into a slurry with solid content of 40%. The slurry was coated onto 1.5"×3.0" ceramic substrate (400 cells per square inch) to have a washcoat loading after calcining of 1.9 g/in$^3$. The coated catalyst was then dried at 100° C. and calcined at 550° C. for 2 hours. The catalyst was tested according to Procedure 1 and the results are given in FIG. 4. FIG. 4 shows that the Ca/Beta zeolite was able to effectively trap the heptane at 150° C.

Procedure 1
HC Trapping Testing Procedure

The hydrocarbon testing efficiency of the acidic Beta zeolite and the alkali and alkaline earth metal Beta zeolite were tested in the diagnostic reactor. The catalyst was tested using heptane as a model hydrocarbon compound. The materials were first heated up in air to 150° C. At 150° C. a gas feed mixture made of 1.5% O2, 2200 ppm C1 (from C7H16), 10% steam, 50 ppm SO$_2$, and balance is N2 was introduced onto the sample maintained at 150° C. The space velocity was 15,000/h. The heptane trapping efficiency of the materials were then recorded at 150° C. over a time period of 20 to 35 minutes. The heptane trapping efficiency was measured as a function of time.

What is claimed:

1. A method of treating gas streams comprising hydrocarbons comprising the steps of:

adsorbing the hydrocarbons on to basic magnesium Beta zeolites at a low adsorption temperature range;

releasing the hydrocarbons from the zeolite at a high release temperature range;

catalytically oxidizing the hydrocarbons.

2. The method as recited in claim 1 wherein the zeolite has substantially no cracking activity.

3. A method of treating diesel engine exhaust gas streams comprising hydrocarbons comprising the steps of:

feeding the diesel engine exhaust gas stream to a composition comprising basic magnesium Beta zeolites;

adsorbing the hydrocarbons on to the zeolite at a low adsorption temperature range;

releasing the hydrocarbons from the zeolite at a high release temperature range; and catalytically oxidizing the hydrocarbons.

4. The method as recited in claim 3 wherein the zeolite has substantially no cracking activity.

5. The method as recited in claim 3 wherein the low temperature adsorption range is below about 200 C.

6. The method as recited in claim 5 wherein the hydrocarbons oxidize at a temperature of at least 200 C.

7. The method as recited in claim 3 wherein the high temperature release range is above about 150 C.

8. The method as recited in claim 7 wherein the high temperature release range is above about 200 C.

* * * * *